United States Patent
Xu et al.

(10) Patent No.: US 8,543,634 B1
(45) Date of Patent: Sep. 24, 2013

(54) SPECIALIZED PROCESSING BLOCK FOR PROGRAMMABLE INTEGRATED CIRCUIT DEVICE

(75) Inventors: Lei Xu, High Wycombe (GB); Volker Mauer, Princes Risborough (GB); Steven Perry, High Wycombe (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/435,133

(22) Filed: Mar. 30, 2012

(51) Int. Cl.
*G06F 15/00* (2006.01)

(52) U.S. Cl.
USPC ............. 708/603; 708/316; 708/523; 326/41; 326/47

(58) Field of Classification Search
USPC ................... 708/316, 523, 603; 326/37–41, 326/47
See application file for complete search history.

(56) References Cited

U.S. PATENT DOCUMENTS

| | | | |
|---|---|---|---|
| 3,473,160 A | 10/1969 | Wahlstrom | |
| 3,800,130 A | 3/1974 | Martinson et al. | |
| 3,814,924 A | 6/1974 | Tate | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |

(Continued)

FOREIGN PATENT DOCUMENTS

| EP | 0 158 430 | 10/1985 |
|---|---|---|
| EP | 0 326 415 | 8/1989 |

(Continued)

OTHER PUBLICATIONS

Martinson, L. et al., "Digital Matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.

(Continued)

*Primary Examiner* — Jason M Crawford
(74) *Attorney, Agent, or Firm* — Ropes & Gray LLP; Jeffrey H. Ingerman (57) ABSTRACT

A specialized processing block such as a DSP block may be enhanced by including direct connections that allow the block output to be directly connected to either the multiplier inputs or the adder inputs of another such block. A programmable integrated circuit device may includes a plurality of such specialized processing blocks. The specialized processing block includes a multiplier having two multiplicand inputs and a product output, an adder having as one adder input the product output of the multiplier, and having a second adder input and an adder output, a direct-connect output of the adder output to a first other one of the specialized processing block, and a direct-connect input from a second other one of the specialized processing block. The direct-connect input connects a direct-connect output of that second other one of the specialized processing block to a first one of the multiplicand inputs.

19 Claims, 9 Drawing Sheets

(56) References Cited

U.S. PATENT DOCUMENTS

| | | |
|---|---|---|
| 4,736,335 A | 4/1988 | Barban |
| 4,754,421 A | 6/1988 | Bosshart |
| 4,791,590 A | 12/1988 | Ku et al. |
| 4,799,004 A | 1/1989 | Mori |
| 4,811,263 A * | 3/1989 | Hedley et al. ............... 708/316 |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,068,813 A | 11/1991 | Thoen |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,623,377 A | 4/1997 | Behrens et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A * | 3/2000 | Yu et al. ............... 708/313 |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |

| | | | | | | |
|---|---|---|---|---|---|---|
| 6,073,154 | A | 6/2000 | Dick | 6,771,094 B1 | 8/2004 | Langhammer et al. |
| 6,075,381 | A | 6/2000 | LaBerge | 6,774,669 B1 | 8/2004 | Liu et al. |
| 6,084,429 | A | 7/2000 | Trimberger | 6,781,408 B1 | 8/2004 | Langhammer |
| 6,085,317 | A | 7/2000 | Smith | 6,781,410 B2 | 8/2004 | Pani et al. |
| 6,091,261 | A | 7/2000 | DeLange | 6,788,104 B2 | 9/2004 | Singh et al. |
| 6,091,765 | A | 7/2000 | Pietzold, III et al. | 6,801,924 B1 | 10/2004 | Green et al. |
| 6,094,726 | A | 7/2000 | Gonion et al. | 6,806,733 B1 | 10/2004 | Pan et al. |
| 6,097,988 | A | 8/2000 | Tobias | 6,836,839 B2 | 12/2004 | Master et al. |
| 6,098,163 | A | 8/2000 | Guttag et al. | 6,874,079 B2 | 3/2005 | Hogenauer |
| 6,107,820 | A | 8/2000 | Jefferson et al. | 6,889,238 B2 | 5/2005 | Johnson |
| 6,107,821 | A | 8/2000 | Kelem et al. | 6,904,471 B2 | 6/2005 | Boggs et al. |
| 6,107,824 | A | 8/2000 | Reddy et al. | 6,917,955 B1 | 7/2005 | Botchev |
| 6,130,554 | A | 10/2000 | Kolze et al. | 6,924,663 B2 | 8/2005 | Masui et al. |
| 6,140,839 | A | 10/2000 | Kaviani et al. | 6,963,890 B2 | 11/2005 | Dutta et al. |
| 6,144,980 | A | 11/2000 | Oberman | 6,971,083 B1 | 11/2005 | Farrugia et al. |
| 6,154,049 | A | 11/2000 | New | 6,978,287 B1 | 12/2005 | Langhammer |
| 6,157,210 | A | 12/2000 | Zaveri et al. | 6,983,300 B2 | 1/2006 | Ferroussat |
| 6,163,788 | A | 12/2000 | Chen et al. | 7,020,673 B2 | 3/2006 | Ozawa |
| 6,167,415 | A | 12/2000 | Fischer et al. | 7,047,272 B2 | 5/2006 | Giacalone et al. |
| 6,175,849 | B1 | 1/2001 | Smith | 7,062,526 B1 | 6/2006 | Hoyle |
| 6,215,326 | B1 | 4/2001 | Jefferson et al. | 7,093,204 B2 | 8/2006 | Oktem et al. |
| 6,226,735 | B1 | 5/2001 | Mirsky | 7,107,305 B2 | 9/2006 | Deng et al. |
| 6,242,947 | B1 | 6/2001 | Trimberger | 7,113,969 B1 | 9/2006 | Green et al. |
| 6,243,729 | B1 | 6/2001 | Staszewski | 7,181,484 B2 | 2/2007 | Stribaek et al. |
| 6,246,258 | B1 | 6/2001 | Lesea | 7,313,585 B2 | 12/2007 | Winterrowd |
| 6,260,053 | B1 | 7/2001 | Maulik et al. | 7,395,298 B2 | 7/2008 | Debes et al. |
| 6,279,021 | B1 | 8/2001 | Takano et al. | 7,401,109 B2 | 7/2008 | Koc et al. |
| 6,286,024 | B1 | 9/2001 | Yano et al. | 7,409,417 B2 | 8/2008 | Lou |
| 6,314,442 | B1 | 11/2001 | Suzuki | 7,415,542 B2 | 8/2008 | Hennedy et al. |
| 6,314,551 | B1 | 11/2001 | Borland | 7,421,465 B1 | 9/2008 | Rarick et al. |
| 6,321,246 | B1 | 11/2001 | Page et al. | 7,428,565 B2 | 9/2008 | Fujimori |
| 6,323,680 | B1 | 11/2001 | Pedersen et al. | 7,428,566 B2 | 9/2008 | Siu et al. |
| 6,327,605 | B2 | 12/2001 | Arakawa et al. | 7,430,578 B2 | 9/2008 | Debes et al. |
| 6,351,142 | B1 | 2/2002 | Abbott | 7,430,656 B2 | 9/2008 | Sperber et al. |
| 6,353,843 | B1 | 3/2002 | Chehrazi et al. | 7,447,310 B2 | 11/2008 | Koc et al. |
| 6,359,468 | B1 | 3/2002 | Park et al. | 7,472,155 B2 | 12/2008 | Simkins et al. |
| 6,360,240 | B1 | 3/2002 | Takano et al. | 7,508,936 B2 | 3/2009 | Eberle et al. |
| 6,362,650 | B1 | 3/2002 | New et al. | 7,536,430 B2 | 5/2009 | Guevokian et al. |
| 6,366,944 | B1 | 4/2002 | Hossain et al. | 7,567,997 B2 | 7/2009 | Simkins et al. |
| 6,367,003 | B1 | 4/2002 | Davis | 7,590,676 B1 * | 9/2009 | Langhammer ................ 708/319 |
| 6,369,610 | B1 | 4/2002 | Cheung et al. | 7,646,430 B2 | 1/2010 | Brown Elliott et al. |
| 6,377,970 | B1 | 4/2002 | Abdallah et al. | 7,668,896 B2 | 2/2010 | Lutz et al. |
| 6,407,576 | B1 | 6/2002 | Ngai et al. | 7,719,446 B2 | 5/2010 | Rosenthal et al. |
| 6,407,694 | B1 | 6/2002 | Cox et al. | 7,769,797 B2 | 8/2010 | Cho et al. |
| 6,427,157 | B1 | 7/2002 | Webb | 7,814,137 B1 | 10/2010 | Mauer |
| 6,434,587 | B1 | 8/2002 | Liao et al. | 7,822,799 B1 | 10/2010 | Langhammer et al. |
| 6,438,569 | B1 | 8/2002 | Abbott | 7,836,117 B1 * | 11/2010 | Langhammer et al. ........ 708/603 |
| 6,438,570 | B1 | 8/2002 | Miller | 7,865,541 B1 | 1/2011 | Langhammer |
| 6,446,107 | B1 | 9/2002 | Knowles | 7,930,335 B2 | 4/2011 | Gura |
| 6,453,382 | B1 | 9/2002 | Heile | 7,930,336 B2 | 4/2011 | Langhammer et al. |
| 6,467,017 | B1 | 10/2002 | Ngai et al. | 7,949,699 B1 | 5/2011 | Neoh et al. |
| 6,480,980 | B2 | 11/2002 | Koe | 8,041,759 B1 * | 10/2011 | Langhammer et al. ........ 708/523 |
| 6,483,343 | B1 | 11/2002 | Faith et al. | 2001/0023425 A1 | 9/2001 | Oberman et al. |
| 6,487,575 | B1 | 11/2002 | Oberman | 2001/0029515 A1 | 10/2001 | Mirsky |
| 6,523,055 | B1 | 2/2003 | Yu et al. | 2001/0037351 A1 | 11/2001 | Hellberg |
| 6,523,057 | B1 | 2/2003 | Savo et al. | 2001/0037352 A1 | 11/2001 | Hong |
| 6,531,888 | B2 | 3/2003 | Abbott | 2002/0002573 A1 | 1/2002 | Landers et al. |
| 6,538,470 | B1 | 3/2003 | Langhammer et al. | 2002/0038324 A1 | 3/2002 | Page et al. |
| 6,542,000 | B1 | 4/2003 | Black et al. | 2002/0049798 A1 | 4/2002 | Wang et al. |
| 6,556,044 | B2 | 4/2003 | Langhammer et al. | 2002/0078114 A1 | 6/2002 | Wang et al. |
| 6,557,092 | B1 | 4/2003 | Callen | 2002/0089348 A1 | 7/2002 | Langhammer |
| 6,571,268 | B1 | 5/2003 | Giacalone et al. | 2002/0116434 A1 | 8/2002 | Nancekievill |
| 6,573,749 | B2 | 6/2003 | New et al. | 2003/0088757 A1 | 5/2003 | Lindner et al. |
| 6,574,762 | B1 | 6/2003 | Karimi et al. | 2004/0064770 A1 | 4/2004 | Xin |
| 6,591,283 | B1 | 7/2003 | Conway et al. | 2004/0083412 A1 | 4/2004 | Corbin et al. |
| 6,591,357 | B2 | 7/2003 | Mirsky | 2004/0103133 A1 | 5/2004 | Gurney |
| 6,600,495 | B1 | 7/2003 | Boland et al. | 2004/0122882 A1 | 6/2004 | Zakharov et al. |
| 6,600,788 | B1 | 7/2003 | Dick et al. | 2004/0148321 A1 | 7/2004 | Guevorkian et al. |
| 6,628,140 | B2 | 9/2003 | Langhammer et al. | 2004/0172439 A1 | 9/2004 | Lin |
| 6,687,722 | B1 | 2/2004 | Larsson et al. | 2004/0178818 A1 | 9/2004 | Crotty et al. |
| 6,692,534 | B1 | 2/2004 | Wang et al. | 2004/0193981 A1 | 9/2004 | Clark et al. |
| 6,700,581 | B2 | 3/2004 | Baldwin et al. | 2004/0267857 A1 | 12/2004 | Abel et al. |
| 6,725,441 | B1 | 4/2004 | Keller et al. | 2004/0267863 A1 | 12/2004 | Bhushan et al. |
| 6,728,901 | B1 | 4/2004 | Rajski et al. | 2005/0038842 A1 | 2/2005 | Stoye |
| 6,731,133 | B1 | 5/2004 | Feng et al. | 2005/0144212 A1 | 6/2005 | Simkins et al. |
| 6,732,134 | B1 | 5/2004 | Rosenberg | 2005/0144215 A1 | 6/2005 | Simkins et al. |
| 6,744,278 | B1 | 6/2004 | Liu et al. | 2005/0144216 A1 | 6/2005 | Simkins et al. |
| 6,745,254 | B2 | 6/2004 | Boggs et al. | 2005/0166038 A1 | 7/2005 | Wang et al. |
| 6,763,367 | B2 | 7/2004 | Kwon et al. | 2005/0187997 A1 | 8/2005 | Zheng et al. |

| | | | |
|---|---|---|---|
| 2005/0187999 | A1 | 8/2005 | Zheng et al. |
| 2005/0262175 | A1 | 11/2005 | Iino et al. |
| 2006/0020655 | A1 | 1/2006 | Lin |
| 2007/0083585 | A1 | 4/2007 | St. Denis et al. |
| 2007/0185951 | A1 | 8/2007 | Lee et al. |
| 2007/0185952 | A1* | 8/2007 | Langhammer et al. ....... 708/493 |
| 2007/0241773 | A1 | 10/2007 | Hutchings et al. |
| 2008/0133627 | A1 | 6/2008 | Langhammer et al. |
| 2008/0183783 | A1 | 7/2008 | Tubbs |
| 2009/0172052 | A1 | 7/2009 | DeLaquil et al. |
| 2009/0187615 | A1 | 7/2009 | Abe et al. |
| 2009/0300088 | A1 | 12/2009 | Michaels et al. |
| 2010/0098189 | A1 | 4/2010 | Oketani |
| 2010/0131577 | A1* | 5/2010 | Gangalakurti et al. ....... 708/209 |
| 2011/0219052 | A1 | 9/2011 | Langhammer |
| 2011/0238720 | A1 | 9/2011 | Langhammer |
| 2011/0320513 | A1 | 12/2011 | Langhammer |
| 2012/0054254 | A1 | 3/2012 | Langhammer |
| 2012/0054256 | A1 | 3/2012 | Langhammer |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO 2005-101190 | 10/2005 |
| WO | WO 2010/102007 | 9/2010 |

OTHER PUBLICATIONS

Farooqui, A., et al., "General Data-Path Organization of a MAC unit for VLSI Implementation of DSP Processors," ISCAS '98, Part 2, May 31, 1998-Jun. 3, 1998, pp. 260-263.

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfiourable Computing. 10th International Conference, FPL 2000. Proceedings (Lecture Notes in Computer Science* vol. 1896) Aug. 27-30, 2000, pp. 456-461.

Aoki, T., "Signed-weight arithmetic and its application to a field-programmable digital filter architecture," *IEICE Transactions on Electronics*, 1999 , vol. E82C, No. 9, Sep. 1999, pp. 1687-1698.

Ashour, M.A., et al., "An FPGA implementation guide for some different types of serial-parallel multiplier-structures," *Microelectronics Journal* , vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, P., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings—Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems" *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters*, vol. 34, No. 7, pp. 638-639 (Apr. 2, 1998).

Heysters, P.M., et al., "Mapping of DSP algorithms on field programmable function arrays," *Field-Programmable Logic and Applications, Roadmap to Reconfigurable Computing. 10th International*

Conference, FPL 2000. Proceedings (*Lecture Notes in Computer Science vol. 1896*), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE* Cat. No. 96TH8140), Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Kramberger, I., "DSP acceleration using a reconfigurable FPGA," *ISIE '99. Proceedings of the IEEE International Symposium on Industrial Electronics* (Cat. No. 99TH8465), vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nakasato, N., et al., "Acceleration of Hydrosynamical Simulations using a FPGA board", *The Institute of Electronics Information and Communication Technical Report CPSY2005-47*, vol. 105, No. 515, Jan. 17, 2006.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN* (European Edition), vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD'03 Conference*, D5, Sep. 2003.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik* , vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

de Dinechin F., et al., "FPGA-Specific Custom Arithmetic Datapath Design: LIP Research Report RR2010-34," Dec. 2010, 8 pages.

IEEE Standard for Binary Floating-Point Arithmetic, *ANSI/IEEE Standard*, Std 754, 1985, pp. 1-14.

IEEE Standard for Floating-Point Arithmetic, *IEEE* Std 754, 2008, pp. 1-58.

Langhammer, "Floating Point Datapath Synthesis for FPGAs," *IEEE International Conference on Field Programmable Logic and Applications*, 2008 (FPL 2008), pp. 355-360 (Sep. 8-10, 2008).

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

\* cited by examiner

SPECIALIZED PROCESSING BLOCK FOR PROGRAMMABLE INTEGRATED CIRCUIT DEVICE

FIELD OF THE INVENTION

This invention relates to a programmable integrated circuit device, and particularly to a specialized processing block in a programmable integrated circuit device.

BACKGROUND OF THE INVENTION

Considering a programmable logic device (PLD) as one example of a programmable integrated circuit device, as applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals (such as by Finite Impulse Response (FIR) filtering). Such blocks are also frequently referred to as multiply-accumulate ("MAC") blocks, because they include structures to perform multiplication operations, and sums and/or accumulations of multiplication results.

For example, PLDs sold by Altera Corporation, of San Jose, Calif., as part of the STRATIX®, ARRIA®, CYCLONE® and HARDCOPY® families include DSP blocks, each of which includes one or more multipliers. Each of those DSP blocks also includes one or more adders and registers, as well as programmable connectors (e.g., multiplexers) that allow the various components of the block to be configured in different ways. In addition, those DSP blocks can be configured for operation at different precisions.

Such blocks typically have included direct connections that allow certain operations to be performed using only a chain or cascade including multiple ones of such blocks, while other operations cannot be completed without routing outputs from one of such blocks through the general purpose logic and interconnect of the programmable device before entering a subsequent one of such blocks.

SUMMARY OF THE INVENTION

In accordance with embodiments of the present invention, a specialized processing block such as the DSP blocks described above may be enhanced by including direct connections that allow the block output to be directly connected to either the multiplier inputs or the adder inputs of another such block.

Therefore, in accordance with embodiments of the present invention there is provided a specialized processing block on a programmable integrated circuit device. The specialized processing block includes a multiplier having two multiplicand inputs and a product output, an adder having as one adder input the product output of the multiplier, and having a second adder input and an adder output, a direct-connect output of the adder output to a first other one of the specialized processing block, and a direct-connect input from a second other one of the specialized processing block. The direct-connect input connects a direct-connect output of that second other one of the specialized processing block to a first one of the multiplicand inputs.

A programmable integrated circuit device may includes a plurality of such specialized processing blocks.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Specialized processing blocks of the type disclosed herein are particularly well-suited for polynomial operations, which may be used in advanced filtering applications, curve fitting, unary functions, Digital Pre-Distortion (DPD), Sampling Rate Conversion (SRC), and other applications.

Any polynomial in one variable may be generalized using the following formula:

$$y(n) = \sum_{k=0}^{K} c_k \cdot |x_n|^k \qquad \text{Eq. (1)}$$

The value of K (the highest power to which the variable x is raised in any term of the polynomial) is referred to as the "order" of the polynomial.

Figure 1:
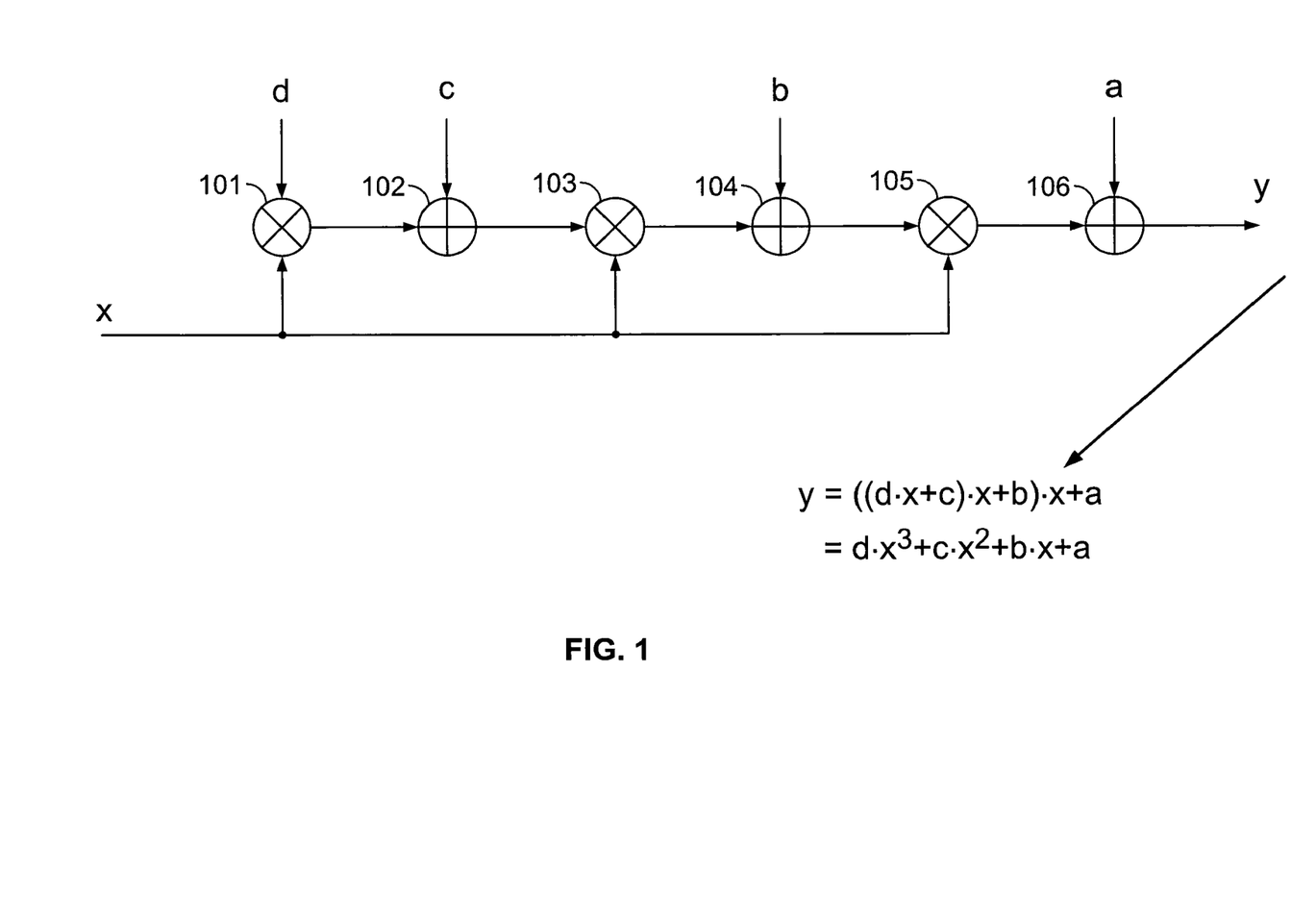
FIG. 1 shows a conceptual representation of a polynomial calculation performed by adder and multiplier circuitry.

Taking as an example a third-order polynomial (K=3), and using a, b, c, d for $c_0$ to $c_3$, Eq. (1) can be rewritten as:

$$y = d \cdot x^3 + c \cdot x^2 + b \cdot x + a = ((d \cdot x + c) \cdot x + b) \cdot x + a \qquad \text{Eq. (2)}$$

where the second line is a transformation according to Horner's Rule, whereby each subsequent term can be derived by a simple multiplication of the previous result by the scalar input variable (plus addition of a constant). This is illustrated in FIG. 1 where x and d are multiplied at multiplier 101 to create dx to which c is added at adder 102. The resultant sum dx+c is multiplied again by x at multiplier 103 and b is added to that result at adder 104. That sum is multiplied again by x at multiplier 105 and a is added at adder 106, to yield y as set forth above. This can be extended to a polynomial of any order.

Figure 2:
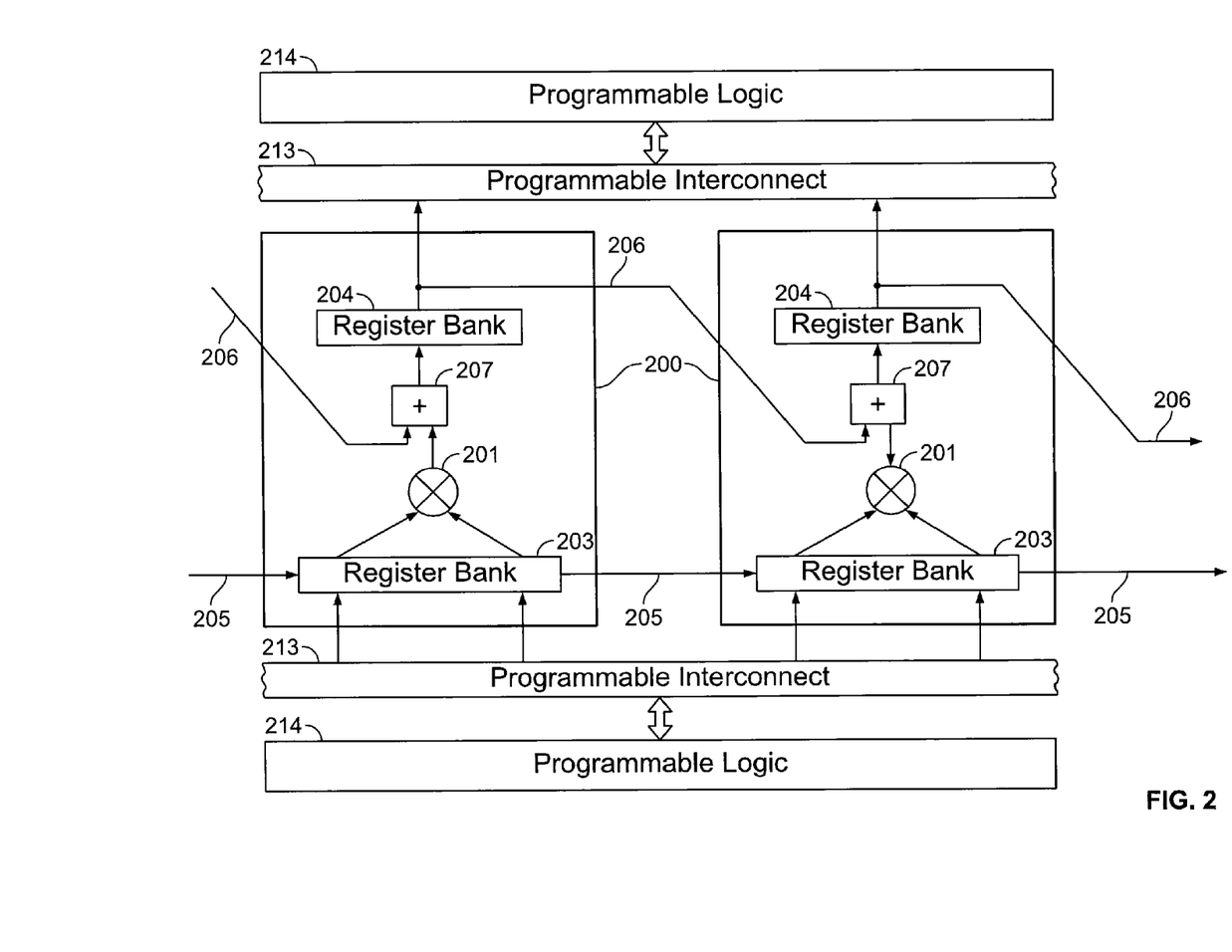
FIG. 2 shows a logical abstraction of a known specialized processing block used in programmable integrated circuit devices.

FIG. 2 shows a logical abstraction 200 of known DSP blocks, such as those described above. Each block 200 includes at least one real or complex multiplier 201 (represented in this drawing by a single multiplier) whose output is directed to at least one adder 207 (represented in this drawing by a single adder). Input registers and output registers, represented in this abstraction by input register bank 203 and output register bank 204, also may be provided, respectively receiving signals from, and directing signals to, programmable interconnect resources 213, which route signals among programmable logic resources 214. Many known DSP blocks also include input signal direct connection (or input chain connection) 205, which may, e.g., allow a plurality of blocks to be used to construct various filter structures such as, e.g., Finite Impulse Response (FIR) filters. Similarly, many known DSP blocks also include output signal direct connection (or output chain connection) 206 to the adder(s) of a subsequent block.

Existing direct connections 205/206 are insufficient to allow polynomial calculations using chains of DSP blocks without resorting to logic and routing resources outside the blocks. As noted above in the Horner's Rule representation of a polynomial calculation, each stage requires the multiplication of the previous result by the scalar variable. However, as noted above in connection with FIG. 2, existing DSP output chain connections are input to the adder of the subsequent DSP block, but not to the multiplier. Therefore, polynomial calculations cannot be performed without using logic and routing resources outside block 200, as shown in FIG. 3.

Figure 3:
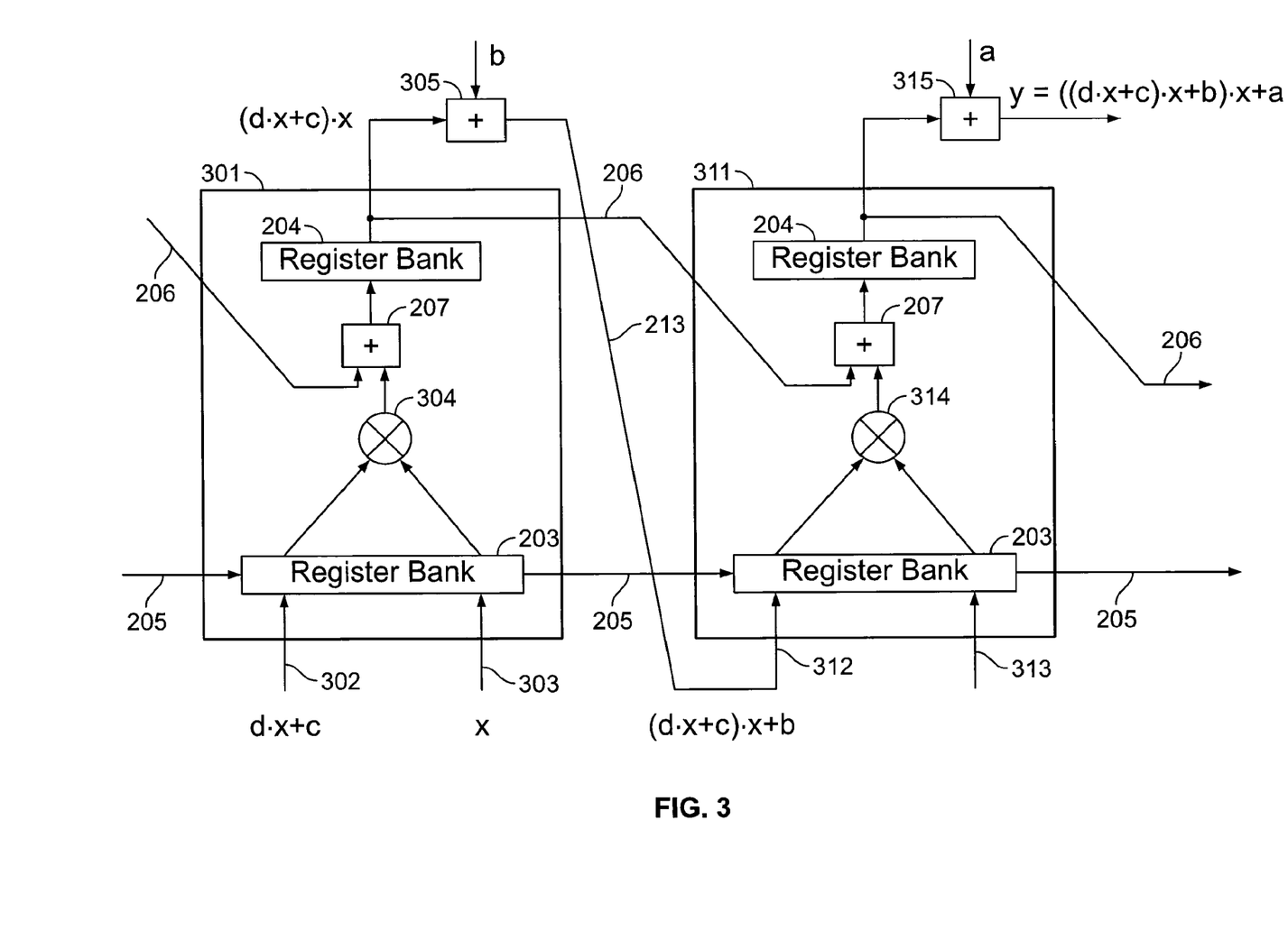
FIG. 3 shows the use of specialized processing blocks such as that shown in FIG. 2 to perform a polynomial calculation in a programmable integrated circuit device.

As seen in FIG. 3, a first DSP block 301 of the type shown in FIG. 2 may be used to multiply a previous result 302 (such as dx+c) by the variable x input at 303, using multiplier 304 to yield (dx+c)x. Because there is no direct connection to the adder 207 of block 301 other than from multiplier 304 or the previous chaining connection 206, in order to add the constant b to (dx+c)x and then multiply that result by x, the result (dx+c)x must be output from block 301 and added to b using an external adder 305 in the general-purpose logic 214 of the programmable device in which blocks 301/302 are contained. That sum can then be routed using general-purpose routing resources 213 of the programmable device, to input (dx+c)x+b at 312 to block 311. The scalar variable x is input at 313, and multiplier 314 is used to yield ((dx+c)x+b)x, which may be output from block 311 and added to the constant a using an external adder 315 in the general-purpose logic 213. Additional blocks may be used in this way depending on the number of terms in the polynomial.

Figure 4:
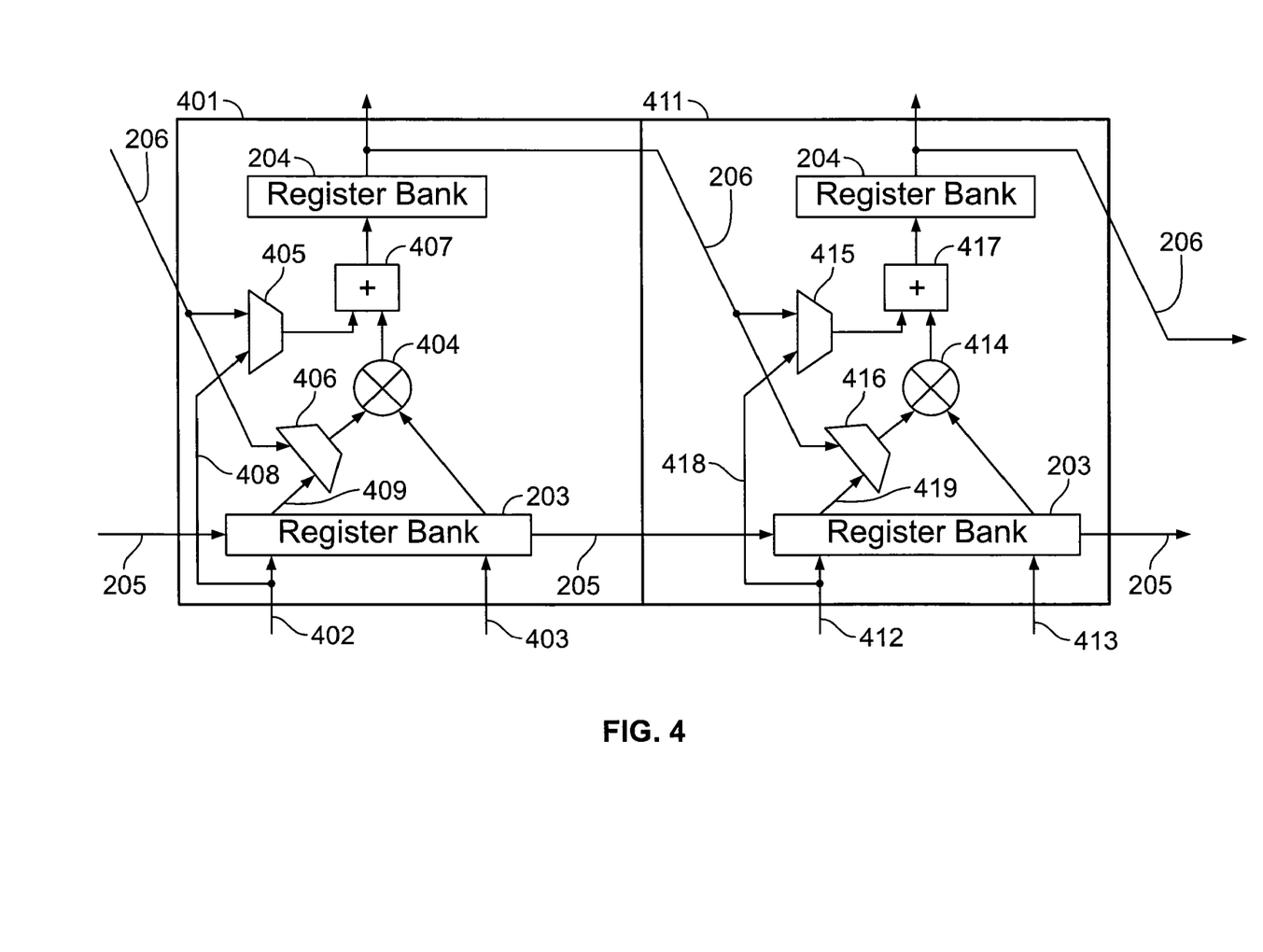
FIG. 4 shows logical abstractions of specialized processing blocks according to an embodiment of this invention for use in programmable integrated circuit devices.

FIG. 4 shows logical diagrams of two occurrences 401/411 an exemplary DSP block according to an embodiment of the invention. In this logical representation, implementational details, such as additional registers and some programmable routing features—such as additional multiplexers that may allow the output of a particular structure to be routed directly out of block 401/411—are omitted to simplify discussion. In addition, some elements that are shown may, in an actual embodiment, be implemented more than once. For example, each of multipliers 404/414 may actually represent two or more multipliers, as in the DSP blocks of the aforementioned STRATIX® and ARRIA® families of PLDs.

In the logical representation of FIG. 4, output chain connection 206 of each block connects, rather than directly to an input of adder 407/417, both to multiplexer 405/415 which allows either connection 206 or input 402/412 (via connection 408/418) to be input to adder 407/417, and to multiplexer 406/416, which allows either connection 206 or input 402/412 (via connection 409/419) to be input to multiplier 404/414. The ability to connect output chain connection 206 to multiplier 404/414 does not exist in known DSP blocks.

Figure 5:
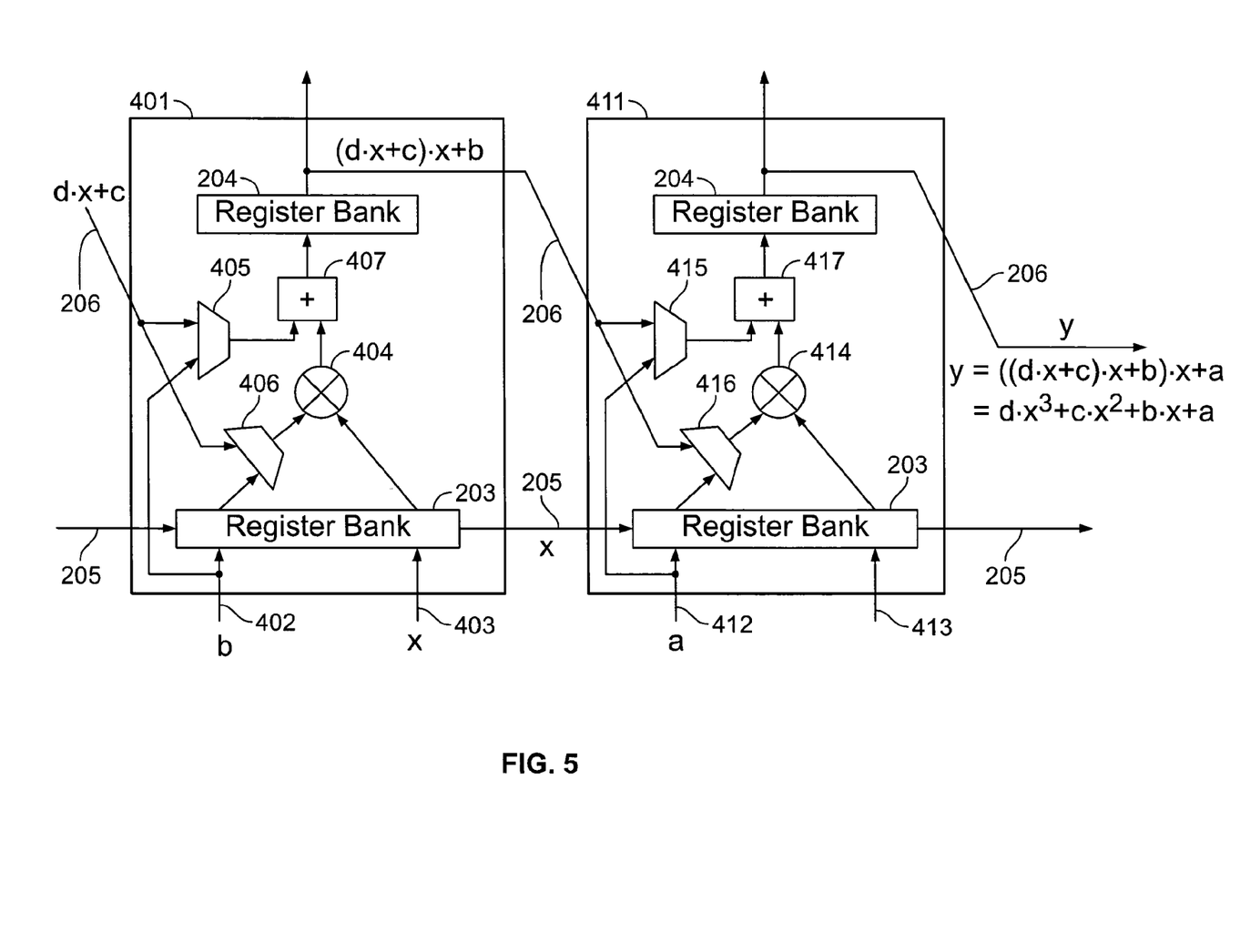
FIG. 5 shows the use of specialized processing blocks such as that shown in FIG. 4 to perform a polynomial calculation in a programmable integrated circuit device.

FIG. 5 shows how blocks 401/411 may be used for a polynomial calculation. In this example, dx+c has been calculated in a previous block (not shown). That result is chained from the previous block via its output chain connection 206, using multiplexer 406 to connect connection 206 to multiplier 404, to which x also is input via input 403. At the same time, b is input to input 402 and multiplexer 405 routes input 402 to adder 407. The other input to adder 407 is the output of multiplier 404, which is (dx+c)x, so that adder 407 outputs (dx+c)x+b.

That result is input via output chain connection 206 of block 401 to block 411, where multiplexer 416 connects connection 206 to multiplier 414, to which x is the other input, propagated via input chain 205. At the same time, a is input to input 412 and multiplexer 415 connects input 412 to adder 417. The other input to adder 417 is the output of multiplier 414, which is ((dx+c)x+b)x, so that adder 407 outputs ((dx+c)x+b)x+a=$dx^3$+$cx^2$+bx+a=y. Output y may be further chained on chain output connection 206 of block 411, or directly on output 420 of block 411.

Figure 6:
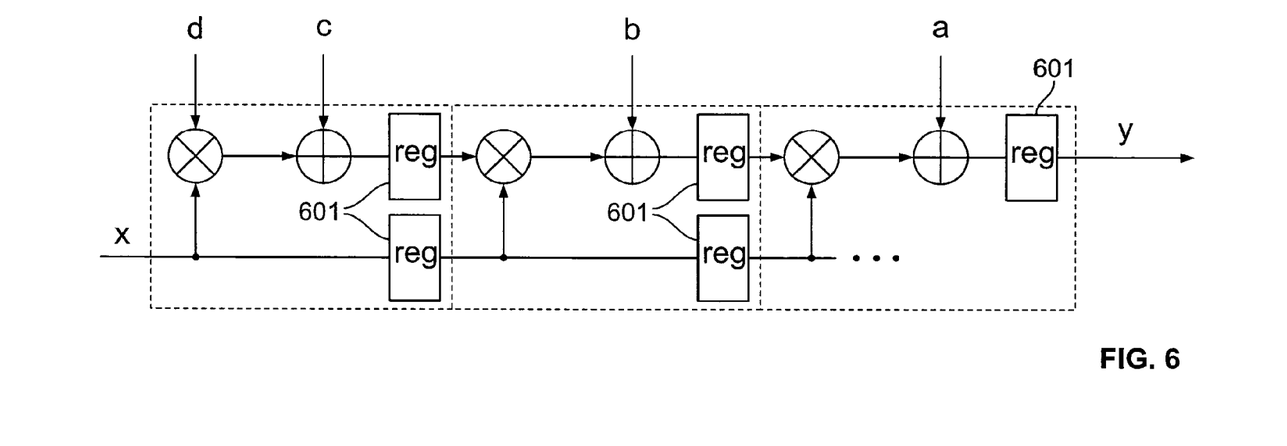
FIG. 6 shows the addition of pipeline registers to specialized processing blocks according to embodiments of this invention.
Figure 7:
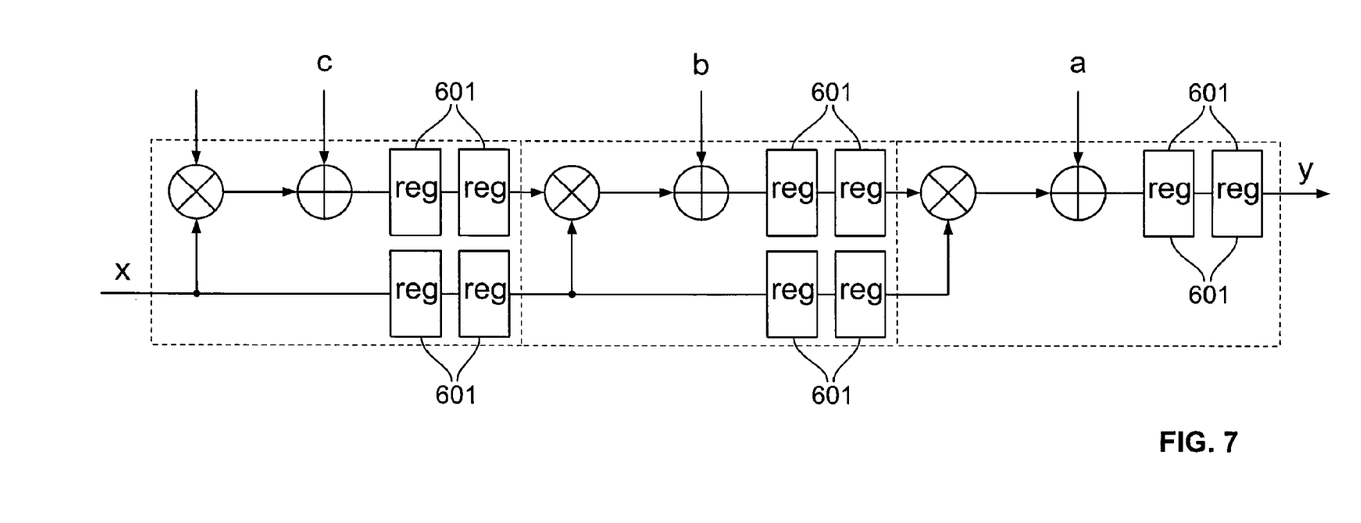
FIG. 7 shows the addition of additional pipeline registers to specialized processing blocks according to embodiments of this invention.
Figure 8:
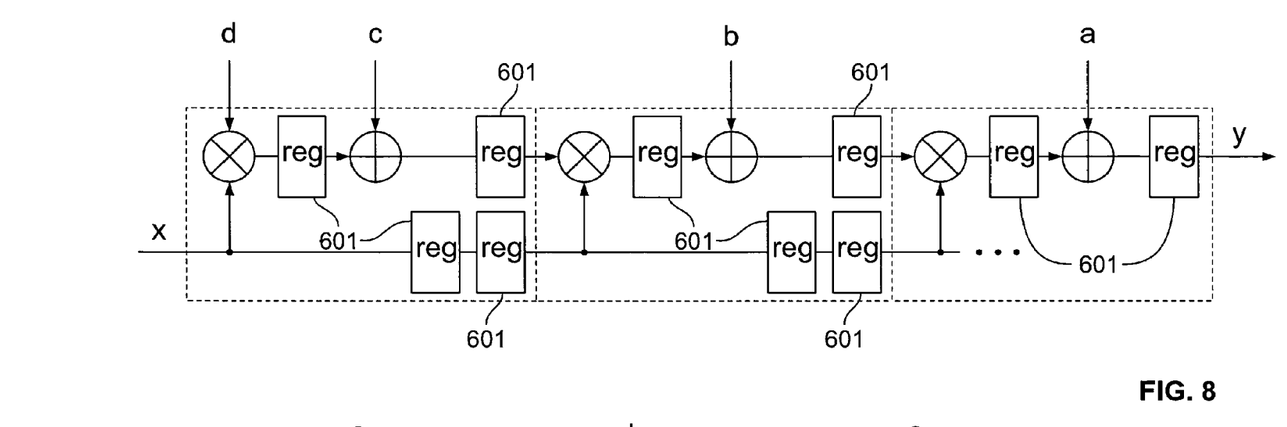
FIG. 8 shows the addition of additional pipeline registers to specialized processing blocks according to embodiments of this invention.

Depending on the size of the polynomial, the number of blocks required may result in unacceptable bit-width growth, which could substantially slow the system. Therefore, additional registers 601 may be provided on the block outputs, including the direct connect outputs to allow for pipelining and implementation of systolic form filters, as seen in FIG. 6. Multiple pipeline registers between stages also can be used, as shown in FIG. 7 where two registers 601 are used between each stage. Moreover, as shown in FIG. 8, some of the pipeline registers 601 can be moved to interior portions of the blocks if that is beneficial in a particular logic implementation.

Figure 9:
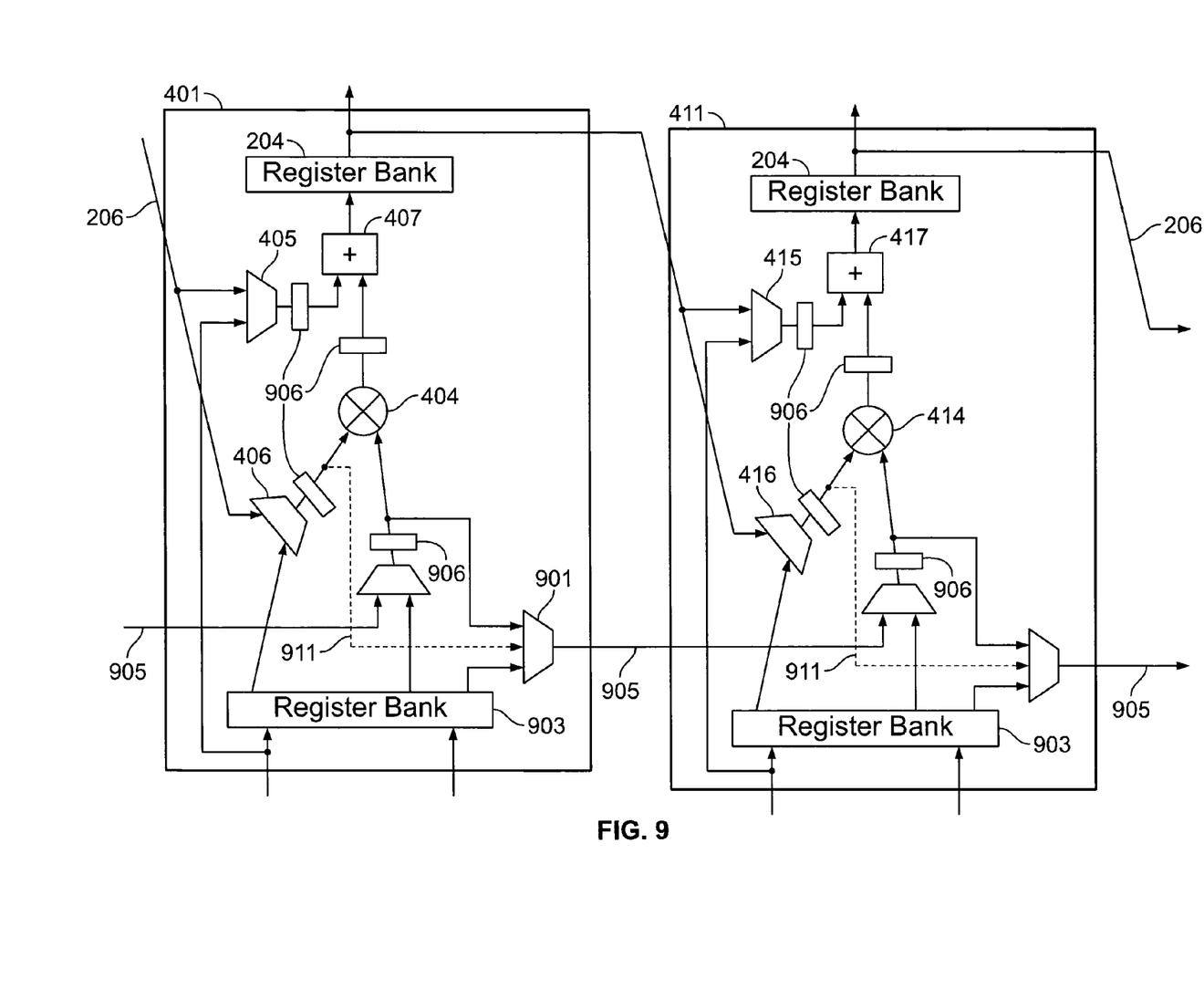
FIG. 9 shows logical abstractions of specialized processing blocks according to another embodiment of this invention for use in programmable integrated circuit devices.

It may be possible to run specialized processing blocks of the type disclosed at speeds higher than the remainder of the device of which the blocks are a part (e.g., twice the device speed). However, in the examples above the variable x has been input through the regular programmable interconnect of the device, and input of x has therefore would be limited by the clock speed of the device. Accordingly, in the embodiment shown in FIG. 9, a multiplexer 901 is added to allow input chain 905 to propagate not only an input from input register bank 903 of the current block or a previous block, but also a value propagated from elsewhere in a previous block. In such an embodiment, the clock speed of the remainder of the device is not a limiting factor when using multiple blocks together at a higher internal clock speed, allowing an increase in throughput, as compared to the throughput of the scalar input variable x, proportional to the higher speed. In such a case, an initial block, upstream of the first block to perform a calculation, may be "wasted" to allow data aggregation—i.e., to enter the value to be propagated so that it can be propagated to the first block, to perform the calculation at the higher clock speed within the blocks.

Figure 10:
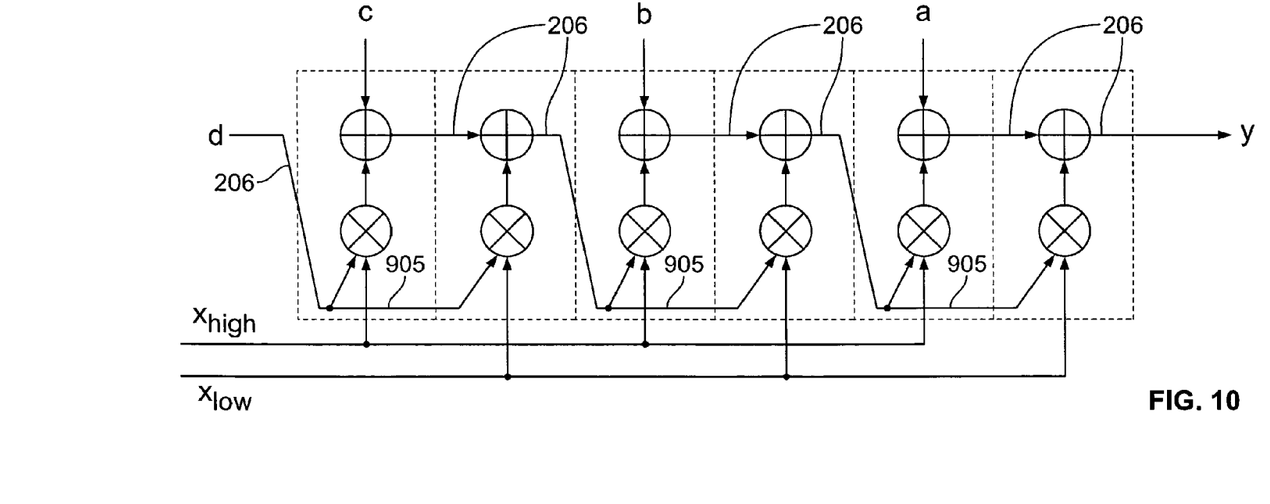
FIG. 10 shows the use of specialized processing blocks such as that shown in FIG. 9 to perform a polynomial calculation in a programmable integrated circuit device.

Configuring circuitry to perform certain mathematical operations may involve groupings of specialized processing blocks. For example, if the multipliers in the specialized processing blocks are capable of multiplying two 18-bit inputs, two blocks can be used together to multiply an 18-bit input by a 36-bit input, with the upper bits of the 36-bit input x being multiplied by the 18-bit multiplicand in one block, and the lower bits of the 36-bit input x being multiplied by the 18-bit multiplicand in a second block. This arrangement, which is shown conceptually in FIG. 10, can be facilitated by adding a further connection 911 (shown in phantom in FIG. 9) that allows the output of a previous block to be propagated via the input chain to a subsequent block. In addition, pipeline registers 906 may be provided in any or all of the locations within the block shown in FIG. 9.

The foregoing embodiments can be implemented with 18-bit-by-18-bit multipliers, 27-bit-by-27-bit multipliers (this is comparable to the 18-bit-by-36-bit case discussed above) and 36-bit-by-36-bit multipliers. This allows the performance of multiplication at different precisions. In addition, mixed precision also is possible, as long as the most-significant bits are aligned (e.g., by scaling the values to a 1.x format, where x=17 for 8-bit multipliers and x=26 for 27-bit multipliers. For example, in implementing a polynomial calculation, it may be desirable to provide greater precision in the higher-order terms, especially in the last few stages.

The precision at the output of a multiplier is the sum of the precisions at the input. If multipliers of the same precision are to be used in a chain, rounding may be carried out between the multiplier output of a stage and the multiplier input of the next stage. Known rounding methods may be used, such as those shown in commonly-assigned U.S. Pat. No. 7,948,267, which is hereby incorporated by reference herein in its entirety.

Even with rounding, and even if both multiplicands are defined to be between −1 and +1, unacceptable bit growth could occur. One way to minimize unacceptable bit growth is to normalize all constants by dividing by the sum of the maximum absolute value of all of the constants.

Thus it is seen that specialized processing blocks that allow implementation of polynomial calculations, as well as other operations, have been provided.

A PLD 140 incorporating specialized processing blocks according to the present invention may be used in many kinds of electronic devices. One possible use is in an exemplary data processing system 1400 shown in FIG. 11. Data processing system 1400 may include one or more of the following components: a processor 1401; memory 1102; I/O circuitry 1403; and peripheral devices 1404. These components are coupled together by a system bus 1405 and are populated on a circuit board 1406 which is contained in an end-user system 1107.

Figure 11:
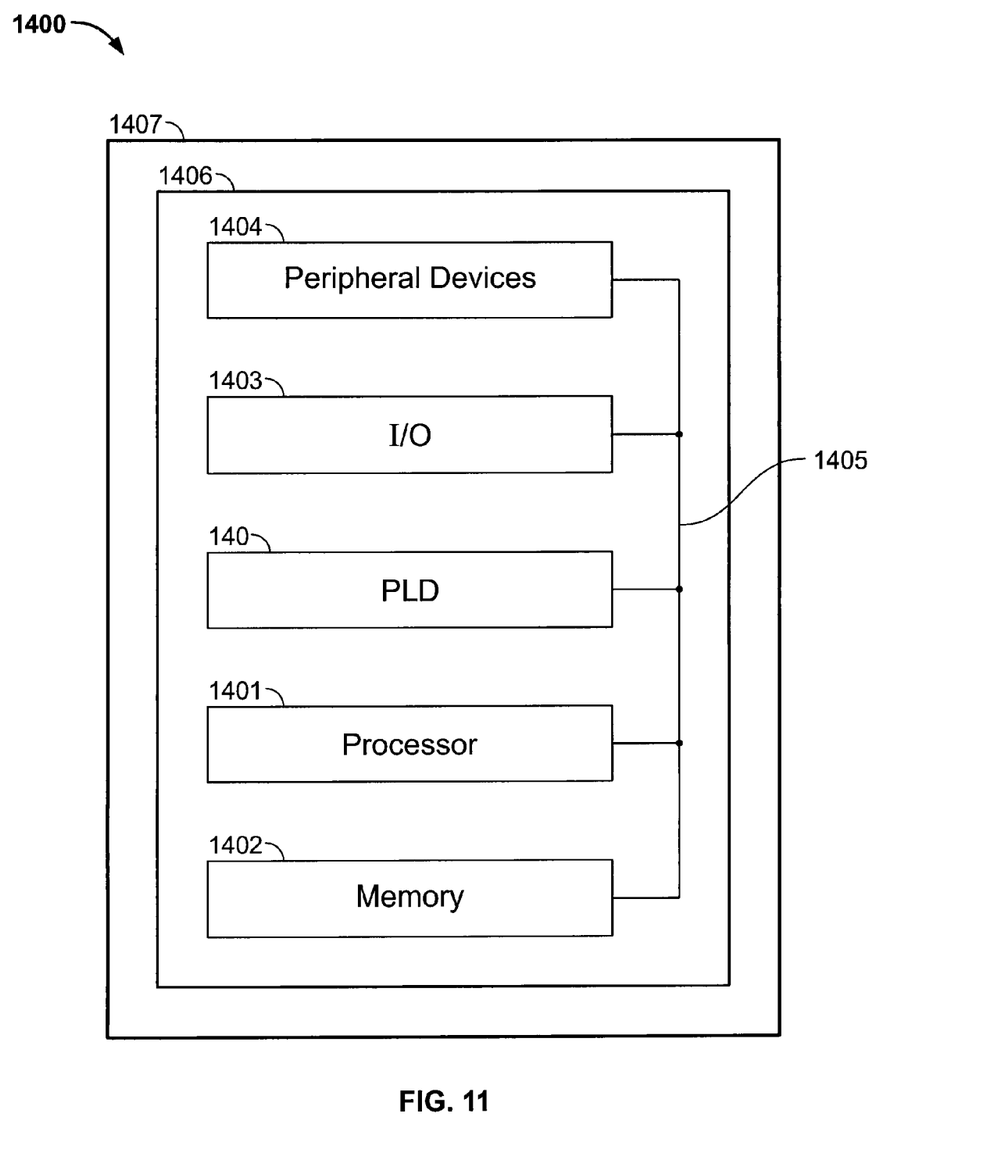
FIG. 11 is a simplified block diagram of an exemplary system employing a programmable logic device incorporating the present invention.

System 1400 can be used in a wide variety of applications, such as computer networking, data networking, instrumentation, video processing, digital signal processing, Remote Radio Head (RRH), or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A specialized processing block on a programmable integrated circuit device, said specialized processing block comprising:
    a multiplier having two multiplicand inputs and a product output;
    an adder having as one adder input said product output of said multiplier, and having a second adder input and an adder output;
    a direct-connect output of said adder output to a first other said specialized processing block; and
    a direct-connect input from a second other said specialized processing block, said direct-connect input connecting a direct-connect output of said adder output of said second other said specialized processing block to a first one of said multiplicand inputs.

2. The specialized processing block of claim 1 further comprising first multiplexer circuitry for selectably connecting said direct-connect input to said first one of said multiplicand inputs and said second adder input.

3. The specialized processing block of claim 2 further comprising:
    at least one input register receiving a value input from outside said specialized processing block and providing said value to a second one of said multiplicand inputs;
    an input register chain output directly connecting an output of said at least one input register to said first other said specialized processing block; and
    an input register chain input directly connecting an input register chain output of said second other said specialized processing block to said second one of said multiplicand inputs.

4. The specialized processing block of claim 3 further comprising an input chain output multiplexer selectably connecting said second one of said multiplicand inputs and said output of said at least one input register to said input register chain output.

5. The specialized processing block of claim 4 wherein said input chain output multiplexer selectably connects said input register chain output to said output of said at least one input register and both said first and second ones of said multiplicand inputs.

6. The specialized processing block of claim 3 further comprising an input chain input multiplexer selectably connecting said output of said at least one input register and said input register chain input to said second one of said multiplicand inputs.

7. The specialized processing block of claim 1 further comprising at least one pipeline register on each of said multiplicand inputs, said one adder input and said second adder input.

8. A programmable integrated circuit device comprising:
programmable logic resources;
programmable interconnect resources for routing signals among said programmable logic resources; and
a plurality of specialized processing blocks, each of said specialized processing blocks comprising:
a multiplier having two multiplicand inputs and a product output;
an adder having as one adder input said product output of said multiplier, and having a second adder input and an adder output;
a direct-connect output of said adder output to a first other one of said specialized processing blocks; and
a direct-connect input from a second other one of said specialized processing blocks, said direct-connect input connecting a direct-connect output of said adder output of said second other one of said specialized processing blocks to a first one of said multiplicand inputs.

9. The programmable integrated circuit device of claim 8 wherein each of said specialized processing blocks further comprises first multiplexer circuitry for selectably connecting said direct-connect input to said first one of said multiplicand inputs and said second adder input.

10. The programmable integrated circuit device of claim 8 wherein each of said specialized processing blocks further comprises:
at least one input register receiving a value input from outside said specialized processing block and providing said value to a second one of said multiplicand inputs;
an input register chain output directly connecting an output of said at least one input register to said first other one of said specialized processing blocks; and
an input register chain input directly connecting an input register chain output of said second other one of said specialized processing blocks to said second one of said multiplicand inputs.

11. The programmable integrated circuit device of claim 10 wherein each of said specialized processing blocks further comprises an input chain output multiplexer selectably connecting said second one of said multiplicand inputs and said output of said at least one input register to said input register chain output.

12. The programmable integrated circuit device of claim 11 wherein said input chain output multiplexer selectably connects said input register chain output to said output of said at least one input register and both said first and second ones of said multiplicand inputs.

13. The programmable integrated circuit device of claim 10 further comprising an input chain input multiplexer selectably connecting said output of said at least one input register and said input register chain input to said second one of said multiplicand inputs.

14. The programmable integrated circuit device of claim 8 wherein each said specialized processing block further comprises at least one pipeline register on each of said multiplicand inputs, said one adder input and said second adder input.

15. A method of configuring a programmable integrated circuit device to calculate a polynomial having a number of terms, wherein said programmable integrated circuit device comprises:
programmable logic resources,
programmable interconnect resources for routing signals among said programmable logic resources, and
a plurality of specialized processing blocks, each of said specialized processing blocks comprising:
a multiplier having two multiplicand inputs and a product output,
an adder having as one adder input said product output of said multiplier, and having a second adder input and an adder output,
a direct-connect output of said adder output to a first other one of said specialized processing blocks, and
a direct-connect input from a second other one of said specialized processing blocks, said direct-connect input connecting a direct-connect output of said adder output of said second other one of said specialized processing blocks to first multiplexer circuitry for selectably connecting said direct-connect input to said first one of said multiplicand inputs and said second adder input; said method comprising, for each respective specialized processing block among a plurality of said specialized processing blocks corresponding to said number of said terms:
configuring said first multiplexer circuitry to connect said direct-connect input to said first one of said multiplicand inputs.

16. The method of claim 15 wherein each of said specialized processing blocks further comprises:
at least one input register receiving a value input from outside said specialized processing block and providing said value to a second one of said multiplicand inputs,
an input register chain output including an input chain output multiplexer selectably directly connecting said second one of said multiplicand inputs and said output of said at least one input register to said first other one of said specialized processing blocks, and
an input register chain input including an input chain input multiplexer selectably directly connecting said output of said at least one input register and said input register chain output of said second other one of said specialized processing blocks to said second one of said multiplicand inputs; said method further comprising, for at least one of said specialized processing blocks:
configuring said input chain output multiplexer to connect said second one of said multiplicand inputs to said input register chain output.

17. The method of claim 16 wherein said input chain output multiplexer selectably connects said input register chain output to said output of said at least one input register and both said first and second ones of said multiplicand inputs; said method further comprising, for at least one of said specialized processing blocks:
configuring said input chain output multiplexer to connect said first one of said multiplicand inputs to said input register chain output for sharing said first one of said multiplicand inputs with another one of said specialized processing blocks.

18. The method of claim 17 further comprising configuring, in said another one of said specialized processing blocks, said input chain input multiplexer to connect said output of said at least one input register to said second one of said multiplicand inputs.

19. The method of claim 15 further comprising configuring pipeline registers on said multiplicand inputs, said one adder input and said second adder input.

* * * * *